(12) United States Patent
Suman

(10) Patent No.: US 9,706,626 B2
(45) Date of Patent: Jul. 11, 2017

(54) INTUI-NETWORK

(71) Applicant: Shailendra Suman, Matthews, NC (US)

(72) Inventor: Shailendra Suman, Matthews, NC (US)

( * ) Notice: Subject to any disclaimer, the term of this patent is extended or adjusted under 35 U.S.C. 154(b) by 347 days.

(21) Appl. No.: 14/639,995

(22) Filed: Mar. 5, 2015

(65) Prior Publication Data

US 2015/0256028 A1   Sep. 10, 2015

Related U.S. Application Data

(60) Provisional application No. 61/950,092, filed on Mar. 8, 2014.

(51) Int. Cl.
| | |
|---|---|
| *H02J 7/00* | (2006.01) |
| *H05B 37/02* | (2006.01) |
| *H02J 7/02* | (2016.01) |
| *H02J 9/06* | (2006.01) |

(52) U.S. Cl.
CPC ............ *H05B 37/0272* (2013.01); *H02J 7/02* (2013.01); *H02J 9/065* (2013.01); *H05B 37/0263* (2013.01); *Y10T 307/344* (2015.04)

(58) Field of Classification Search
CPC ..................................... H02J 7/00; H02J 7/02
See application file for complete search history.

(56) References Cited

U.S. PATENT DOCUMENTS

| | | | |
|---|---|---|---|
| 4,323,820 A | 4/1982 | Teich | |
| 7,481,546 B2 | 1/2009 | Nielson et al. | |
| 8,896,151 B2 * | 11/2014 | Yamane | H02J 7/35 307/23 |
| 8,907,523 B2 | 12/2014 | Mohammed Suhura et al. | |
| 2003/0141819 A1 | 7/2003 | Cojocary | |
| 2012/0038467 A1* | 2/2012 | Sutardja | H05B 37/0254 340/12.33 |

FOREIGN PATENT DOCUMENTS

| | | |
|---|---|---|
| GB | 2208192 A | 8/1989 |
| JP | 2006288049 A | 10/2006 |

* cited by examiner

*Primary Examiner* — Hai L Nguyen

(57) ABSTRACT

In the field of appliances connected to the power grid, it is sometimes desirable for such appliances to function even in the absence of grid power. Example applications include emergency lighting or public address systems. It is sometimes further desirable that such appliances be controllable in the absence of grid power, for example responding to commands to turn on or off. Appliances are described that can function in the absence of grid power, yet remain under control of a switch, actuator, or other control device. A control device may be local or remote. Appliances may be controlled via power-line communication. Appliances may sense the state of a switch even where other appliances are connected on a local circuit.

18 Claims, 9 Drawing Sheets

INTUI-NETWORK

RELATED APPLICATIONS

The present application claims the benefit of priority of U.S. Provisional Patent Application No. 61/950,092, entitled "INTUI-NETWORK", filed Mar. 8, 2014, the entirety of which is hereby incorporated by reference herein for all purposes.

BACKGROUND

Power interruptions and outages may have adverse effects on users. Users may be unable to use electrical devices (e.g., appliances) and may thereby be inconvenienced, harmed, or otherwise adversely effected.

SUMMARY

Various embodiments include an appliance, such as a light, that can function with or without grid power. Further, the appliance can be controlled even in the absence of grid power.

Existing systems, such as emergency lighting systems, may come on when grid power is lost. However, it may still be desirable, for example, that a light switch can control an emergency lighting system. Existing systems cannot distinguish between an "on" and "off" state of a light switch in the absence of power, for example, because in both cases there is no grid power detected at the light. Thus, existing systems remain on until grid power is restored, regardless of whether or not remaining on is desirable.

Various embodiments disclosed herein allow an appliance to sense and respond to control signals even in the absence of grid power. In some embodiments, a transponder is situated on the same circuit, but separated by a control switch. The transponder puts out signals over the power lines in the absence of grid power. If an appliance detects signals from the transponder, the appliance can thereby infer the state of the intervening control switch (e.g., infer that the switch is closed), and can thereby respond by activating, deactivating, or otherwise changing its state.

Various embodiments allow an appliance to be controlled remotely, such as through a cellular phone that sends commands to a transponder, which in turn relays such commands to the appliance.

Various embodiments further allow for an appliance or transponder to report to a utility the local state of the electrical network, thereby potentially allowing the utility to more quickly manage or fix problems. Various embodiments further allow for a utility to manage power demand across an electrical network by sending commands to appliances to switch to or from battery power. For example, if a utility senses high demand for power, it can send commands to one or more appliances to switch to using battery power.

DETAILED DESCRIPTION

Figure 1:
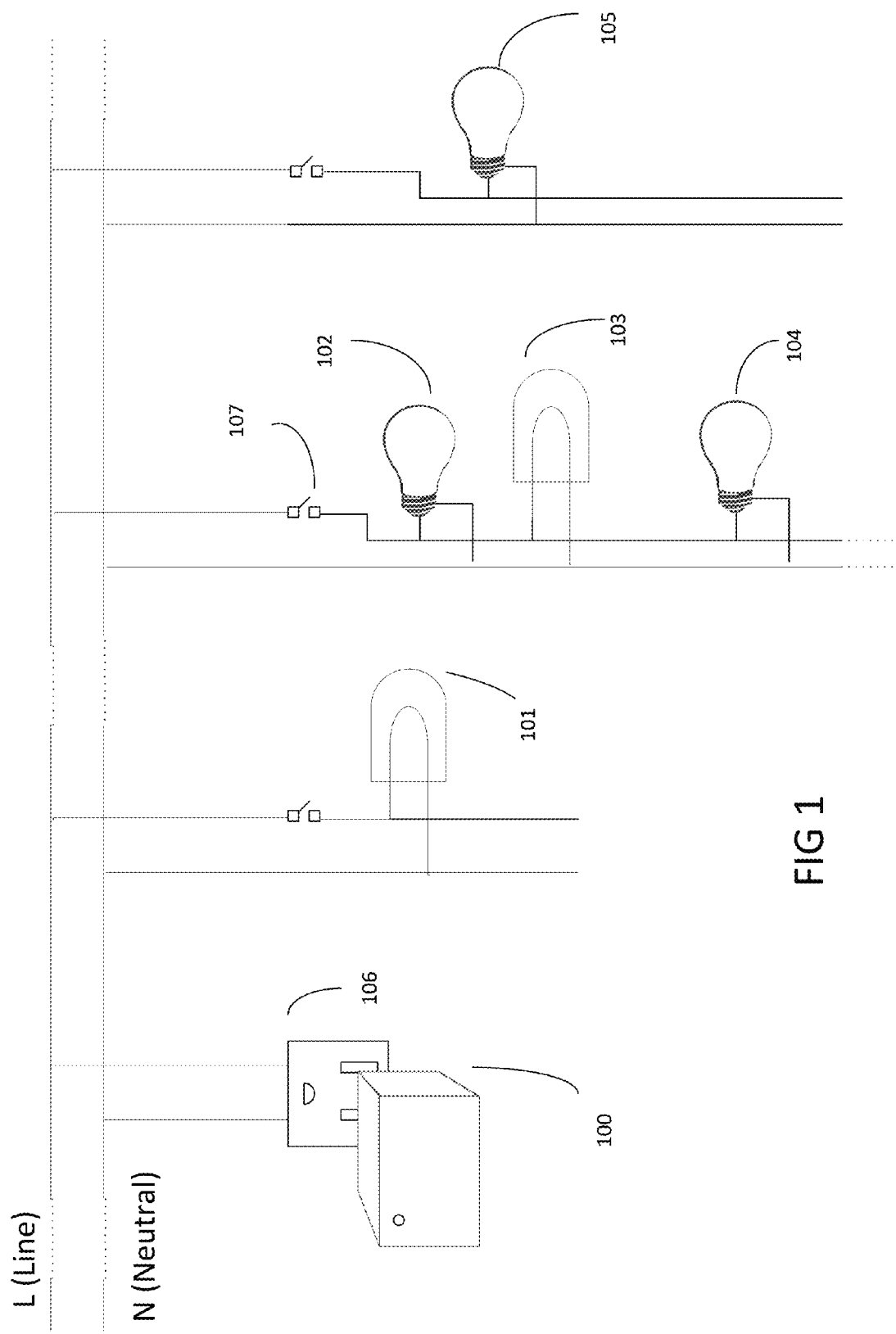
FIG. 1 depicts a block diagram of an illustrative I-N system according to some embodiments.

Home appliances or products such as compact fluorescent light (CFL) bulbs, light-emitting diode (LED) lamps or bulbs, perfume diffusers, etc., may work well when there is grid power at home, offices, or other locations where such appliances are in use. However, when the grid power fails, the devices may fail to function, may become uncontrollable, and/or may become uncontrollable as to certain device functionalities.

Various embodiments include a device that is capable of function in the absence of grid power. Various embodiments include a device that can be controlled in the absence of grid power. Various embodiments include a device with individual functionalities that can be controlled in the absence of grid power. Various embodiments include a device that is capable of functioning both with and without grid power.

Various embodiments include a system that includes a network of two or more devices, one or more of which is capable of functioning without grid power. Various embodiments include a network with one or more devices capable of functioning without grid power, and with one or more transponders capable of sending control signals to one or more of such devices.

As used herein, the term "Intui-Network", also referred to as "I-N", "I-N System", "Intu-Network", "Intuilite", and the like, includes one or more devices which may be connected via a network (e.g., a communications network; e.g., a wireless network), where such devices may be capable of functioning both with grid power and without grid power, and where such devices may be controllable by another device, such as by a transponder. As will be appreciated, various other names can be used to describe this network, and the particular name chosen for use in this application is not intended to be limiting in any way.

In various embodiments, the I-N system may include one or more devices with various utility or functionality, such as LED lamps or bulbs, perfume or scent diffuser. These devices are referred to herein as "I-N appliances".

In various embodiments, the I-N system may include one or more control devices. A control device may be capable of sending commands or signals to an I-N appliance. These commands or signals may cause an I-N appliance to execute one or more functions, take one or more actions, switch on, switch off, or perform any other task. In various embodiments, a control device may automatically send commands or signals to an I-N appliance. In various embodiments, a control device may first receive human input (e.g., via buttons, knobs, switches, levers, spoken voice commands, etc.), and then translate such human input into commands for one or more I-N appliances. As used herein, an I-N control device is referred to as an "I-N transponder".

In various embodiments, an I-N transponder may be used to control all the I-N appliances in a given building (e.g., in a given home), in a given office, on a given network, and/or falling within any other location, and/or falling within any other category. An I-N transponder may maintain a connection (e.g., a network connection, e.g., a connection via a wireless communication link, e.g., a communication link, e.g., an intermittent communication link) with the I-N appliances both in the presence and absence of grid power.

In various embodiments, an I-N transponder may automatically locate one or more I-N appliances. In various embodiments, an I-N transponder may automatically initiate communication with one or more appliances. In various embodiments, an I-N transponder may initiate communication with one or more appliances immediately when the I-N transponder is installed, and/or immediately when one or more appliances are installed, and/or at any other time. In various embodiments, an I-N transponder may build a network with I-N appliances. Users can add any number of appliances at any point in time. I-N appliances then become part of the I-N system. User may employ the I-N transponder to add appliances, e.g., by indicating which I-N appliance belongs to a given network.

In various embodiments, an I-N transponder is a battery and grid power operated device. This device may be connected to any power socket at a home, offices, or other location. In various embodiments, the I-N transponder has its own unique master ID and continuously communicates with the I-N appliances, and may communicate with every I-N appliance that is part of the same network (e.g., electrical network; e.g., communication network).

In various embodiments, the I-N appliances works on the same communication channel as the I-N transponder. In various embodiments, the I-N appliances work on both the battery and the grid power.

In various embodiments, an I-N appliance may include one or more controllable features. For example, in various embodiments, an LED bulb may be of various types and may include features such as light temperatures, colour temperature, wattage, brightness, lumens etc. An LED bulb with one or more of these features may be controllable by user control via the I-N appliance itself (e.g., on the LED bulb itself) or via the I-N transponder.

Various embodiments include I-N transponder and various I-N appliances.

In various embodiments, an I-N transponder can be connected to a single phase socket and powered (e.g., continuously powered) from the grid power. The I-N transponder may include a rechargeable battery which charges the transponder through grid power. In the absence of grid power, the transponder may function on its own battery. The I-N transponder may have various user interfaces such as switches of varying positions, LED's with light provision, an AC socket (also called as secondary socket) for learning the I-N appliances in a given network, wireless control, etc.

According to various embodiments, the I-N transponder may have a secondary socket of E26/E27 type. In various embodiments, this socket may not be connected to 110V. Instead it may have low battery voltage out and can send communication to the I-N appliances when connected to this socket. The I-N transponder can send a unique code to a connected I-N appliance so that the I-N transponder and associated or paired I-N appliance can communicate with each other point to point and share control interface. Similarly, the I-N transponder may assign a unique address to any I-N appliance connected to the secondary AC socket to share unique or broadcast interface between the paired I-N transponder and I-N appliances.

In various embodiments, an I-N appliance, or appliances, will work on grid power as well as on battery power (e.g., rechargeable battery).

In various embodiments, an I-N appliance may comprise one or more component parts. Component parts may include a battery compartment, controls (e.g., switches, buttons, etc.), and any other component. The components may be modular in nature. The components may be readily separable from one another. In some embodiments, the battery compartment may be separable so that the battery can be easily replaced.

In various embodiments, the LED bulbs can have a detachable mechanism for battery replacement, and may have ring or switch control to change the LED light temperature, LED brightness, lumens, wattage etc. With these controls, the user may be given multiple or many choices of application. The controls may also serve to improve the battery life by allowing a user to make choices to conserve power. For example, a user may reduce the lumens of an LED when the user knows that grid power won't be available for a long time, etc.

In various embodiments, an I-N appliance could include an LED bulb with detachable system. Each detachable system may be a modular system with connectors, snapping mechanisms, locks, magnets, or any other components that allow such system to be connected to another system. For example, multiple detachable systems could be snapped together or otherwise assembled.

In various embodiments, one appliance may comprise such detachable components as a battery compartment, electronics, and lens or optic. Advantages provided by such system may include that the LED section which generates lot of heat is isolated from the battery. The LED electronics may have different heat sink detachable systems such that the battery compartment is isolated from this section. This may help improve the battery life. An LED may have much more life than does a battery, so with the detachable architecture one can use the LED to its fullest life and keep replacing the battery when its life is over.

In various embodiments, the detachable battery can have multiple options in terms of selecting the battery capacity. So a user can buy the battery of various sizes based on their back-up power requirements. In various embodiments, the detachable architecture works such that the devices optics section can give omnidirectional light output.

In various embodiments the I-N transponder and the I-N appliances may work together or independently to achieve similar or enhanced feature as mentioned below.

In various embodiments, the I-N transponder may have a mechanism by which it learns the I-N appliances which belong to it network and communicate with only those I-N appliances. This can be achieved by the self-learning mechanism with various user interfaces. With this self-learning mechanism, the I-N system can isolate itself from other I-N systems as they may be installed in the adjacent home or commercial network.

In various embodiments, the I-N transponder can function like a night lamp, in addition to its core functionalities. The I-N transponder may have a Blue-tooth or Wi-Fi interface to communicate with smart devices such as smart phones, tablets, etc., irrespective of whether grid power is on or off.

In various embodiments, a smart device may have one or more user interfaces by which to control the light temperature, lumens, brightness, battery life, and/or any other functionality and/or any other operating parameter of one or more I-N appliances. A smart device may control an I-N appliance via the I-N transponder. In various embodiments, a smart device sends one or more commands or signals to the transponder. The transponder, in turn, sends one or more commands or signals to one or more I-N appliances in order to control the operation of the one or more appliances in accordance the commands from the smart device. In various, a smart device may control a single I-N appliance (e.g., via an I-N transponder). In various embodiments, a smart device may control multiple I-N appliances. In various embodiments, a single command from a smart device may apply to multiple I-N appliances. For example, a user may use a single command to dim multiple LED lights. In various embodiments, controls may apply to one or many I-N appliances simultaneously and/or independently.

In various embodiments, a smart device may present a user interface and program functionality in the form of a software application, or "app".

In various embodiments, the I-N transponder may comprise a slider control or control in various other forms such as switch position control, rotating control, etc., to control an I-N appliance (e.g., for dimming the light output of the I-N appliance; e.g., for performing any other function of the appliance). A smart device may also control the function of an I-N appliance (e.g., a dimming function) by communicating with the I-N transponder, with the I-N transponder in turn controlling the I-N appliance. In various embodiments, the dimming control may happen to one or many I-N appliances simultaneously and independently.

In various embodiments, the I-N transponder and/or smart device may have an explicit user and control interface for selecting battery hours. The user may select more battery back-up hours, for example, in case that the user knows a grid outage may last for a long time.

In various embodiments, an I-N appliance or an I-N transponder may have a socket plug such as a USB or any other type to charge a cell phone (or any other device) during power outages.

In various embodiments, the I-N transponder and I-N appliances may have microphone and speaker interfaces. The user can directly talk to any or all of these devices, with such devices then passing the audio signal to other I-N transponder(s) and/or I-N appliances installed in other rooms or floors. For example, in various embodiments, a user may speak into an I-N transponder or I-N appliance, at which point the user's speech may be converted to electrical signals, and communicated to another I-N transponder or appliance, after which the electrical signal may be converted back into an audio signal and broadcast via a speaker of the I-N transponder or appliance.

In various embodiments, smart devices (e.g., smart phones) can send and receive the audio signal from an I-N transponder. The I-N transponder in turn communicates this audio signal to individual or all the I-N appliances based on the user control on the smart device. For example, the user may indicate, via a user interface of his smart device, to which other devices he would like to communicate the audio signal.

In various embodiments the audio communication may happen in the presence or absence of grid power and act like an intercom for voice communication or broadcast communication for a given network.

With reference to FIG. 1, a system is depicted according to various embodiments. The I-N system has I-N transponder and equipment with I-N appliances and standard electrical gadgets which are non-I-N appliances.

There may be single or many transponders in the system (e.g., an electrical network) as shown in FIG. 1. There also may be single or many systems (e.g., electrical networks), e.g., as depicted in FIG. 1, which systems may be connected or isolated from each other. For example, a network in one home or office may be connected to another network in another home or office via a grid electricity network.

In various embodiments, FIG. 1 represents a home or office electrical network with a single phase supply. The electrical network may be a single phase supply with main two electrical lines run together, i.e. Line and Neutral. The network may have a 5 A (5 Ampere) socket, e.g. as depicted as 106. The transponder module 100 may be inserted in socket 106. If socket 106 has switch control then the switch may need to be kept in the ON condition all the time.

In various embodiments, a network (such as that depicted in FIG. 1) may have many bulbs and lamps. There may be a bulb with single switch control as depicted in 101. There may be many bulbs, including either CFL, LED or any other technology with switch control as depicted in 102, 103, 104 and 107. There may be other electrical gadgets such as fans, TV's, mobile chargers, mosquito repellent, etc., on the same network (e.g., as depicted in FIG. 1). These may be in various configurations (e.g., as depicted in 101, 102, 103, 104 and 107). There may be other devices such as LED bulbs or incandescent bulbs with spate switch control as depicted in 105.

The following is a non-exclusive list of various configurations and embodiments.

1. The I-N transponder from one network can communicate with I-N appliances in other networks. These may be networks in neighboring houses or other nearby networks.
2. There may be one or a plurality of I-N appliances in one network.
3. There may be one or a plurality of I-N appliances in a first network in communication with one or a plurality of I-N appliances in a second network and/or in other networks.
4. There may be one or a plurality of I-N transponders in one network.
5. There may be one or a plurality of I-N transponders in a first network in communication with one or a plurality of I-N transponders in a second network and/or in any other network.
6. There may be one or a plurality of I-N appliances communicating with one or a plurality of I-N appliances within the same network.
7. There may be one or a plurality of I-N appliances communicating with one or a plurality of I-N transponders within the same network.
8. There may be one or a plurality of I-N appliances communicating with one or a plurality of I-N transponders in other networks.
9. There may be one or a plurality of I-N appliances with a single control switch as shown in 107 of FIG. 1.
10. There may be a combination of I-N appliances and non-I-N appliances with a single control switch as shown in 107 of FIG. 1.
11. There may be one or a plurality of circuits connected in parallel. For example, the configurations described above with respect to points 9 and 10 may have circuits connected in parallel.
12. According to various embodiments, an I-N transponder may transmit and/or repeatedly transmit a code. In some embodiments, the code may be unique to the particular I-N transponder. In some embodiments, the code may be used by a group of I-N transponders (e.g., by a plurality of transponders), each of which, for example, may transmit the same code. The code may be a standard broadcasting code.
13. According to various embodiments, an I-N transponder may have battery back-up for its own operation. The same battery or battery back-up may also act as a primary battery for charging secondary devices such as mobile phones, portable devices, etc.
14. According to various embodiments, an I-N transponder may have its own battery and its own battery may act as secondary battery if it's getting charged by an external primary battery.
15. According to various embodiments, an I-N transponder may have a control interface for a user to control various parameters of the I-N transponder, which may allow a user to have control capabilities over and above controlling parameters of one or more I-N appliances. Can be wifi or other protocol
16. According to various embodiments, an I-N transponder may have a wireless interface for communication with external devices such as smart phones, smart devices communicating over wireless protocol, or any other devices.
17. As used herein, a wireless protocol could be standard Wi-Fi Ethernet, Blue-tooth, active RF-ID proprietary, Zig-bee, IR (infra-red), Li-Fi interface, and/or any other wireless protocol.
18. According to various embodiments, an I-N transponder may have a physical interface for E26, E27, or similar sockets for non-US regions.
19. According to various embodiments, an I-N transponder may have soft or hard switch(s) for various applications. The switch(s) may control such things as its own operational state or state machine; communication with I-N appliances over an electrical network or over E26, or E27 or similar socket for non-US regions; and smart devices over wireless (e.g., as described above with respect to point 17 mentioned above).
20. According to various embodiments, an I-N transponder may have an LED light or bulb integrated in it for various applications, such as for lighting the I-N transponder in the absence of grid power, to function as a standalone, light etc.
21. According to various embodiments, an I-N transponder may have a buzzer, speaker, and/or other sound output for various applications. Such applications may include indicating its own operational state or state machine; indicating communication with I-N appliances over an electrical network or over E26, E27, or similar socket for non-US regions; and indicating communication with smart devices over a wireless network (e.g., as described with respect to point 17 mentioned above.
22. According to various embodiments, a user may insert an I-N appliance in the E26/E27 socket of the I-N transponder. This may pair the I-N transponder with the I-N appliance. The user may insert the I-N appliance in the I-N transponder and press the switch (e.g., as mentioned in point 19), or press the switch and insert the I-N appliance for to create a pairing between the I-N appliance and I-N transponder. After pairing, there may be point to point communication between the I-N transponder and one or more I-N appliances. The I-N transponder may still be able to send broadcast communication to one or a plurality of I-N appliances. With pairing in place, the user within a first I-N system may be able to control and/or communicate with a second I-N system (e.g., with one or more transponders and/or with one or more devices within the second I-N system). For example, a user of an I-N system in home 1 or office 1 may be able to control and communicate with an independent I-N system of neighbouring home or a distant home, or a neighbouring office or a distant office.
23. In various embodiments, a user may install I-N appliances in various rooms, e.g., with a first I-N appliance in a kitchen, a second I-N appliance in a living room, and a third I-N appliance in a bedroom. As will be appreciated, I-N appliances may be installed in various other locations. According to various embodiments, there may be a smart device (e.g., a smart phone) which will map the I-N appliances on the smart device application. The smart device may be capable of generating a virtual map, which may be stored in memory, and which may indicate the locations (e.g., coordinates; e.g., rooms), absolute positions, and/or relative spatial positions of one or more I-N appliances. In various embodiments, to map the locations of the I-N appliances, the user may turn on and off the I-N appliances according to a procedure or methodology. In some embodiments, a user turns on one I-N appliance at a time. For example, the user may keep an I-N appliance in the kitchen in an ON state, and turn OFF the rest of the I-N appliances at the user's home. In this scenario, the smart device may communicate with the I-N transponder and send commands to search for I-N appliances. The kitchen I-N appliance may then respond to the I-N transponder about its presence (e.g., because the kitchen device is the only device currently ON). The I-N transponder may then communicate the status of I-N appliance to the smart device application. The smart application now knows that the I-N appliance belongs to the kitchen. The smart device may also receive an input from the user that the I-N appliance that is currently ON is located in the kitchen. For example, the smart device may prompt the user to enter the location of the currently ON I-N appliance. In various embodiments, the smart device itself may tell the user which I-N appliance to turn on at a given time (e.g., "turn on the appliance in the kitchen"), and may thereby derive the location of an I-N appliance that is currently on. In a similar way, a smart device can map the rest of the I-N appliances installed at various rooms. With this mapping, the smart application can enable various functions such as controlling each I-N appliance independently, broadcasting common messages, etc.
24. In various embodiments, an application for mapping I-N appliances need not create a spatially accurate map. Rather, in some embodiments, a network map, logical map, topological map, or other map may be created in which the relative positions of appliances is not necessarily proportional to their actual relative positions.
25. According to various embodiments the I-N transponders and I-N appliances may have microphone, speaker, buzzers, etc. for various applications. Applications may include:
    a. A smart device can transmit an audio signal to an I-N system. The I-N system can produce the audio output of the smart device over its speaker for emergency purposes or for an intercom type of application.
    b. A user can speak into the I-N system (e.g., into a transponder or device) such that this audio signal is transmitted to other I-N appliances or transponders. This can allow communication in an emergency or intercom type of application.

c. A user can speak into an I-N system such that the audio signal is received by any or all of the I-N transponders. The I-N transponder(s) in-turn transmit audio data to a smart device. The smart device produces the audio signal over its speaker for emergency or intercom type of applications.

Figure 2:
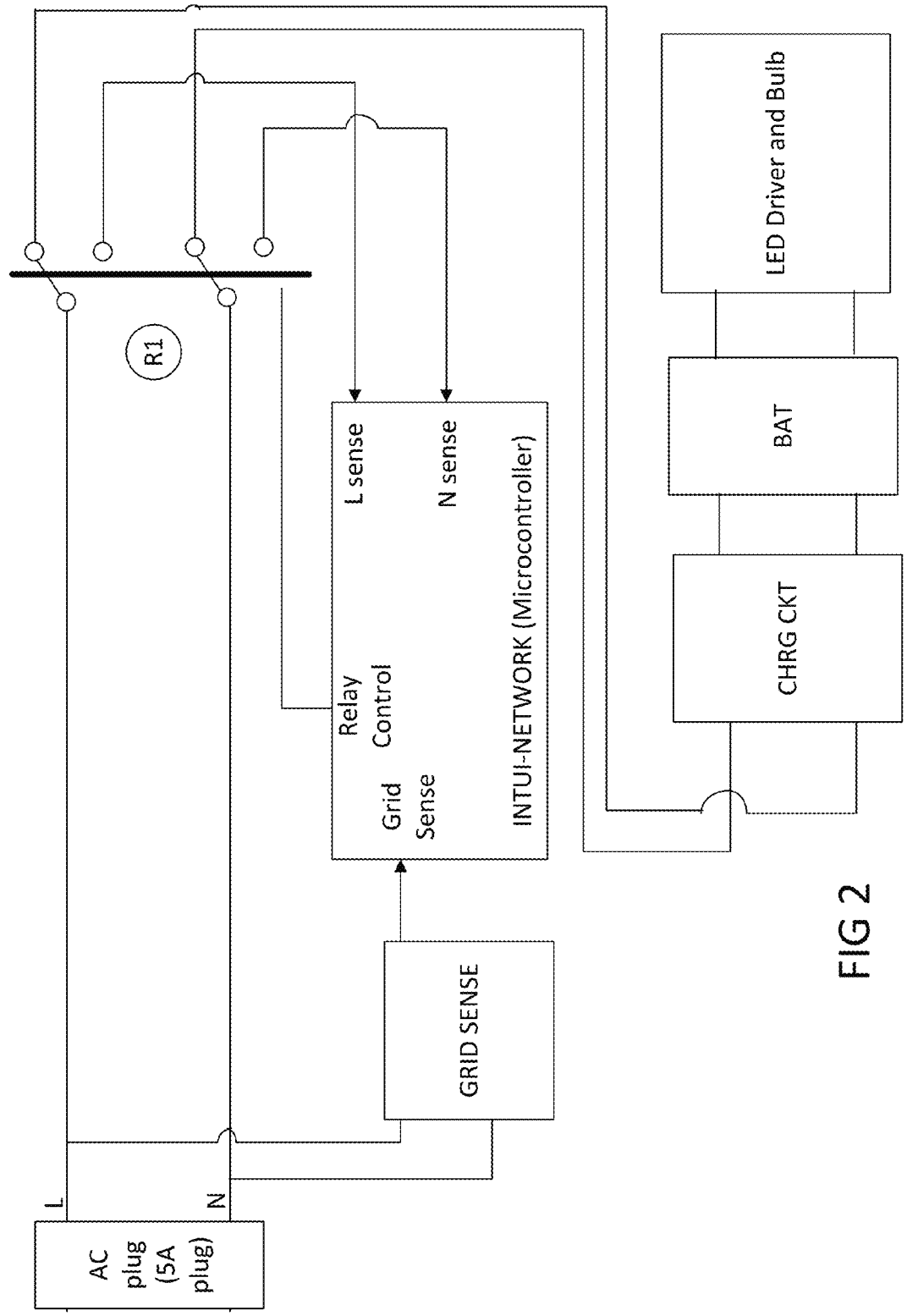
FIG. 2 depicts a block diagram of an exemplary I-N appliance with an LED bulb application and similar types.

With reference to FIG. 2, a block diagram is depicted of an exemplary I-N appliance with an LED bulb application and similar types.

In various embodiments, circuitry within the appliance monitors power in the network. The circuitry may determine at any given point, whether there is power or not. If there is a loss of power detected, or an absence of power, or any other predetermined power condition, then the appliance may be caused to activate in some fashion. Activation may entail having a light come on or otherwise having an output module activate. Activation may also entail that the appliance listens for instructions. The appliance may listen for instructions from a transponder, for example. In various embodiments, the appliance listens for instructions only when there is no power detected in the electrical network. In various embodiments, the appliance executes instructions only when there is no power in the network.

In various embodiments, an appliance may continue listening for new instructions for so long as the power is off. Once the power returns to the electrical network, the appliance may stop listening for new instructions. The appliance may also deactivate (e.g., its light may shut off).

In various embodiments, the appliance may listen for and/or follow instructions even if there is grid power.

Figure 3:
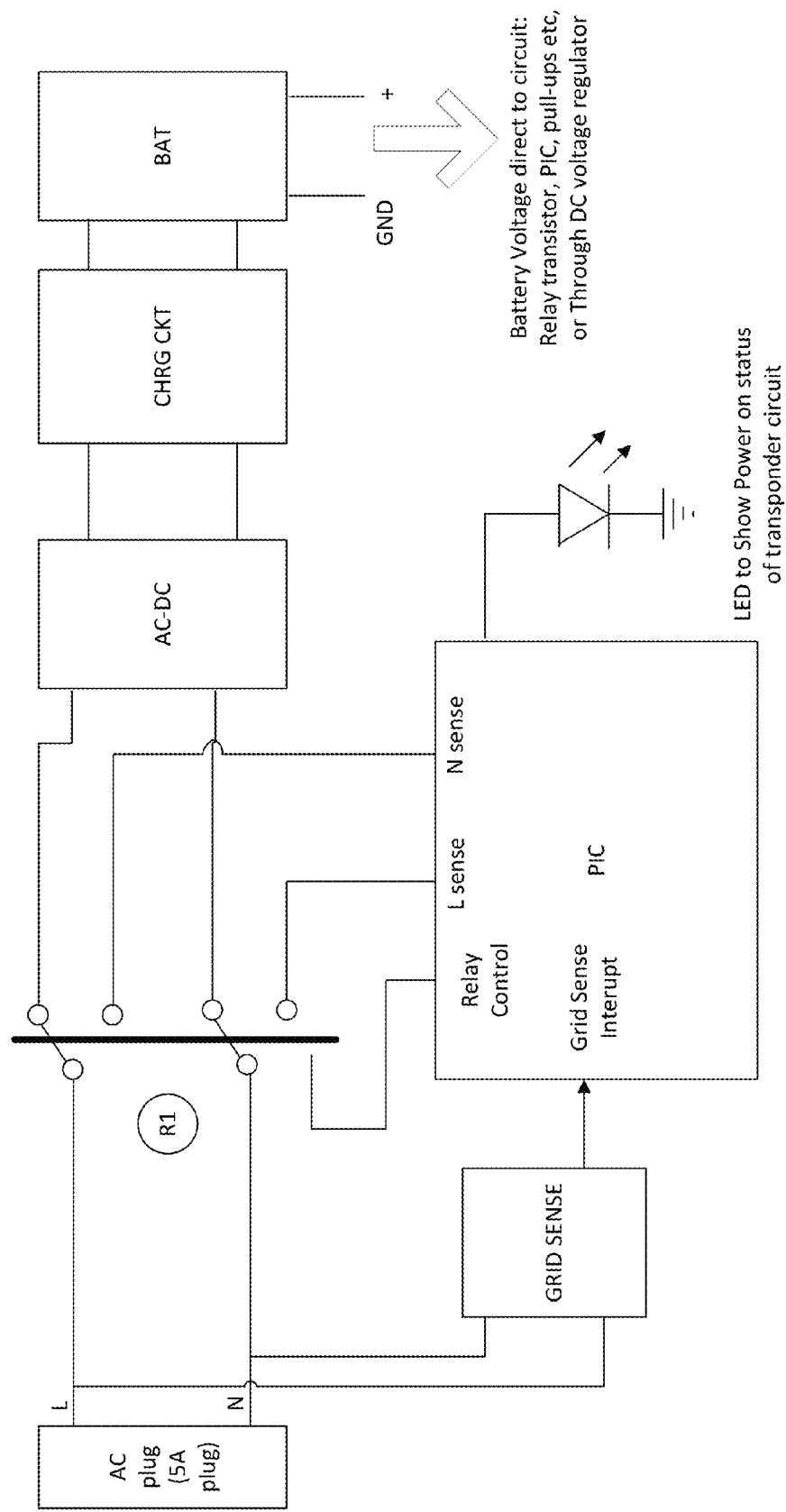
FIG. 3 depicts a block diagram of an exemplary I-N transponder according to some embodiments.

With reference to FIG. 3, a block diagram of an exemplary I-N transponder is depicted according to some embodiments.

In various embodiments, a transponder may receive commands from a user device, such as a smart phone, cellular phone, a personal computer, and/or any other device. The user device may communicate with the transponder via Bluetooth, Wi-Fi, Ethernet, or via any other mode. The transponder may, in turn send commands to an appliance over an electrical network using power line communication. In various embodiments, the transponder may communicate with the appliance via other mediums, including via wireless communication, Bluetooth, Wi-Fi, or via any other mode of communication.

In various embodiments, a transponder may include an internet router. In various embodiments, an internet router may be part of a transponder. In various embodiments, a transponder may be capable of receiving and/or retransmitting internet traffic and/or other network traffic.

In various embodiments, a transponder may receive a command from a user device. The user device may be remote, such as within a different building, a different town, a different city, a different state, etc. The user device may transmit the command via the Internet. The transponder may receive the command via the Internet. The transponder may receive the command via its internet router. As will be appreciated, a transponder may receive a user command in various other ways as well, including via cellular communication, Bluetooth, Wi-Fi, etc.

A transponder may, in turn, relay a command to an appliance. The transponder may relay the command using power line communication. In this way, a user remote to an appliance may send commands to the appliance. For example, a user who is away from home may transmit a command to a light in this home to turn on.

In various embodiments, a user may identify a particular appliance. The user may identify the appliance by name, location (e.g., "bedroom"), identifier, description (e.g., "light bulb"), or by any other means. The user may identify the appliance on a user interface and/or "application" or "app" on a mobile device. The user may identify the appliance in various other ways, as will be appreciated. For example, a user may open an app on his smartphone which shows a map of his home. The user may select an appliance that is shown on the map, e.g., by touching the relevant location of the appliance.

In various embodiments, once the user has identified an appliance, the user may input a command for the appliance, such as "turn on", "turn off", etc. The command may then be sent to the transponder. In various embodiments, the command may be sent directly to the appliance.

In various embodiments, the transponder may relay the command using any other form of communication.

Figure 4:
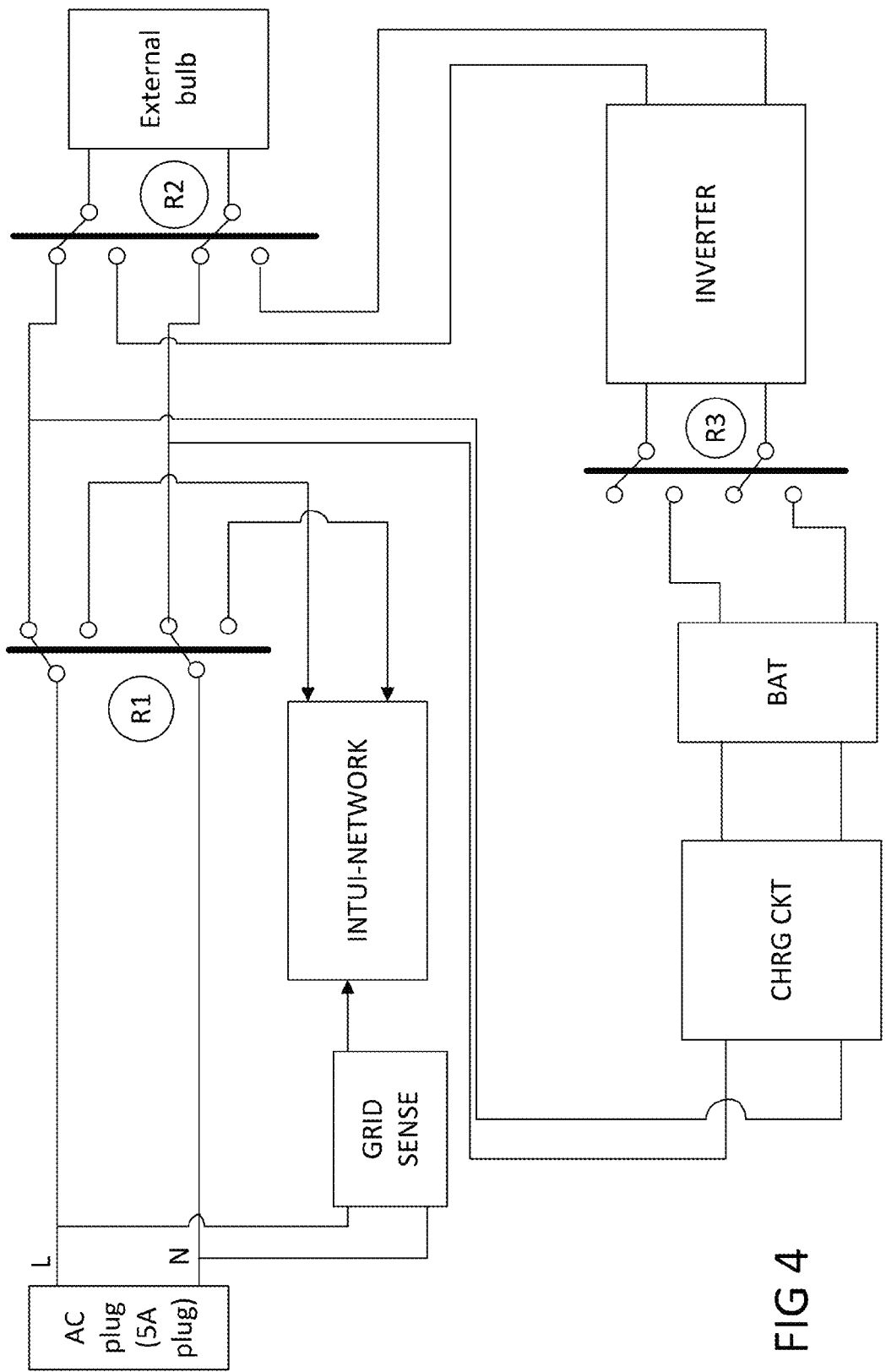
FIG. 4 depicts a block diagram of an exemplary I-N appliance for an external bulb application and similar types.

With reference to FIG. 4, a block diagram is depicted of an exemplary I-N appliance for an external bulb application and similar types.

In various embodiments, a circuit may contain a mixture of Intu-network appliances and ordinary appliances. For example, a circuit may contain both an Intu-network light bulb and an ordinary (e.g., incandescent) light bulb. Even with such a mixture of appliances, a single switch (e.g., a light switch) may be used to control the Intu-network appliance in various embodiments. In various embodiments, in the absence of grid power, the Intu-network appliance may send a signal through the circuit to see if the signal passes through the closed switch and returns to the Intu-network appliance. If such a return signal is detected, the Intu-network appliance may determine that it is supposed to activate (e.g., have its light turn on), because the controlling switch can be inferred to be in its closed state. If, however, a return signal is not detected, the Intu-network appliance may determine that it is not supposed to activate, because the controlling switch can be inferred to be in its open state, thereby preventing any signal from traversing a full loop and returning to the Intu-network appliance.

Complicating matters, however, is the possibility that a signal sent by the Intu-network appliance may travel through the other, ordinary appliance in the circuit, and return to the Intu-network appliance even if the controlling switch is in its open state. The Intu-network might then be misled to think the switch was closed, since it has received the return signal.

According to various embodiments, signalling between an I-N transponder and an I-N appliance may allow the I-N appliance to determine when a control switch is on or off in the absence of grid power even if there are other appliances on the same circuit.

Streaming Content Over the Internet

In various embodiments, an appliance may output internet content. For example, an appliance may output music, music from Internet radio, speeches, news, announcements, video, images, or any other Internet content. In various embodiments, an appliance may output content from sources other than the Internet (e.g., from a local network). In various embodiments, a transponder my receive content from the Internet and may relay such content to an appliance via power line communication. For example, a transponder may receive signals that encode audio, music or radio content from the internet, and may convert such signals to power line communication for relaying to an appliance. The appliance may then receive the power line communication signals, and output the content for human consumption, e.g., in the form of audio or visuals.

In various embodiments, a transponder or other device may convert audio signals received via the Internet to power line communication signals.

PLC ASK Circuit

Figure 5:
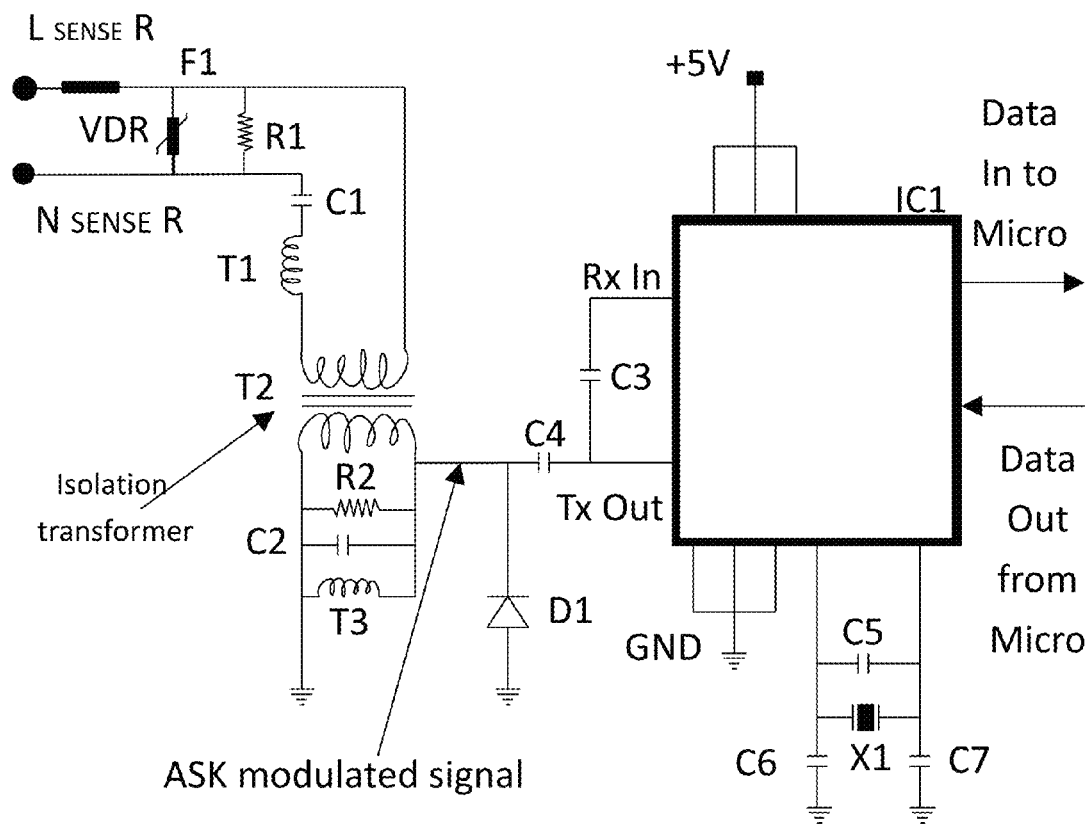
FIG. 5 depicts a block diagram of a power-line communication (PLC) amplitude shift key (ASK) circuit, according to some embodiments.

Reference is now made to FIG. 5. Various embodiments include a power-line communication (PLC) amplitude shift key (ASK) circuit. Terminals "L SENSE R" and "N SENSE R" are connected to main Line and Neutral wires of the home network when grid power is off. A relay from a Micro circuit connects or disconnects the "L SENSE R" and "N SENSE R" from the main Line and Neutral wires. An ASK modulator, which may be implemented as an IC TDA5051AT integrated circuit chip, receives the signal from "L SENSE R" and "N SENSE R" which has been broadcasted by a transponder. Another circuit component, which may be implemented as a TDA5051AT integrated circuit chip, demodulates the signal and sends the demodulated signal over DATA OUT pin. This signal acts as input signal (Data In) to Micro circuit.

Micro Circuit

Figure 6:
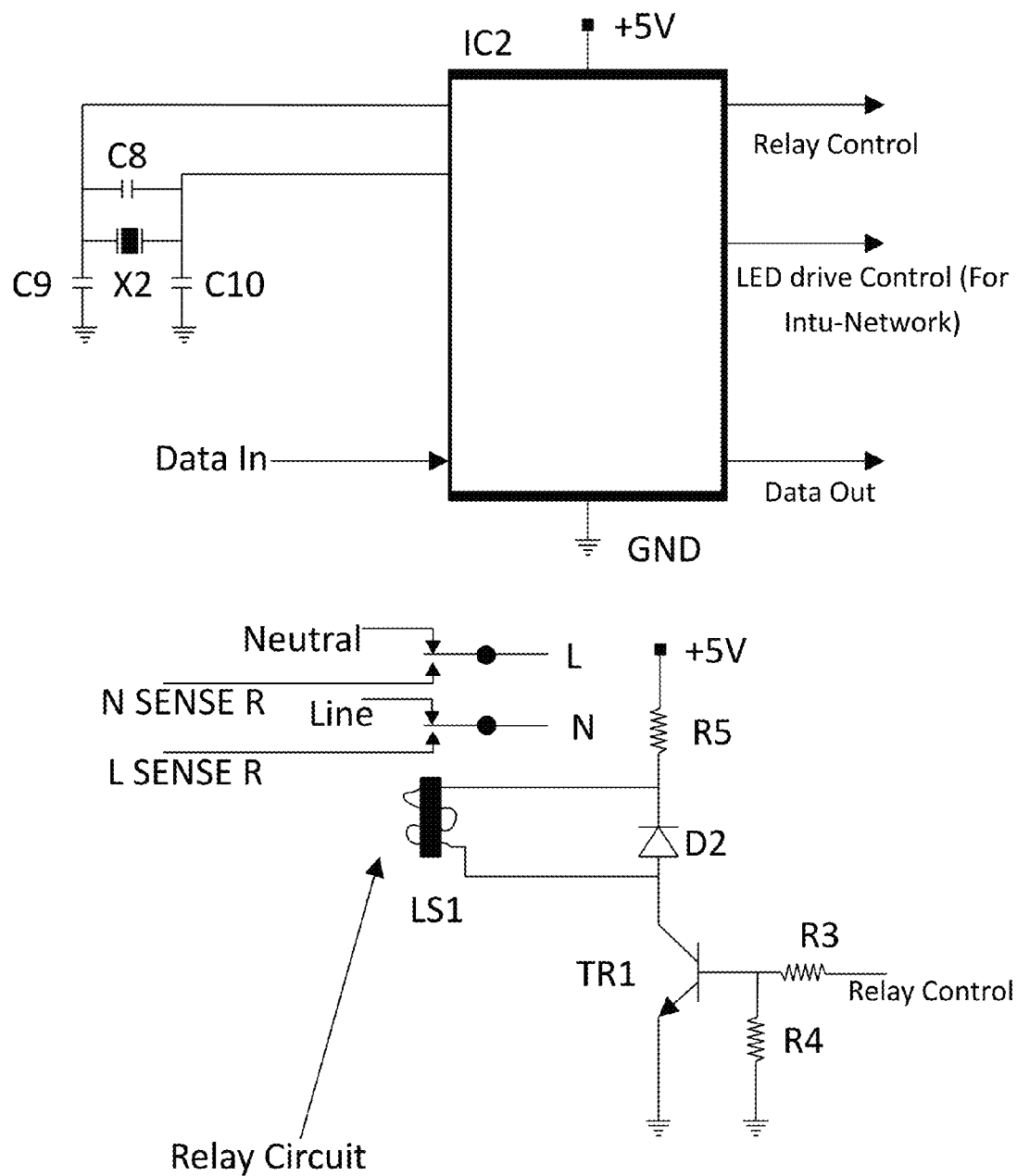
FIG. 6 depicts a block diagram of a "Micro circuit" that may sense grid power, receive signals from the PLC ASK circuit, and control an output module, such as that of an appliance, according to some embodiments.

Reference is now made to FIG. 6. Various embodiments include a "Micro circuit" that may sense grid power, receive signals from the PLC ASK circuit, and control an output module, such as that of an appliance. In various embodiments, the Micro circuit is powered by a battery. It receives the signal on GRID SENSE interrupt whenever there is a grid failure. The RELAY CONTROL pin outputs the HIGH (1) Signal. This in turn operates the relay LS1. The common pins of relay L and N gets connected to "L SENSE R" and "N SENSE R". The "L SENSE R" and "N SENSE R" are connected to the PLC ASK circuit.

The Micro Circuit receives the data from PLC ASK circuit. The "Data In" is decoded by a Microcontroller designated "U1". If the decoded data is the same as broadcasted data from the transponder then the LED pin of the U1 IC is turned high. This LED pin in turn keeps the LED bulb section in ON state even in the absence of grid power. The entire Intu-network circuit would receive a signal only if the On/Off switch of the Intu-network is in On state. This way, any Intu-network circuit whose On/Off switch is On and the transponder is broadcasting the signal would receive the ASK modulated signal and keep its own LED light in On state.

Figure 7:
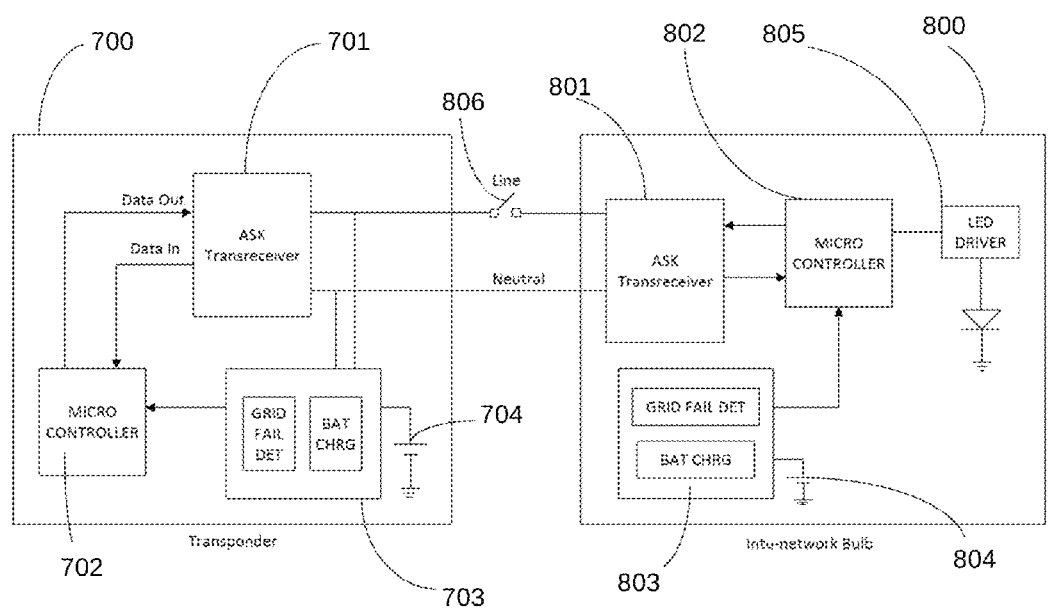
FIG. 7 depicts a block diagram of a transponder-appliance system, according to some embodiments.

Reference is now made to FIG. 7. The block 700 is a transponder. The 701 is a ASK (amplitude shift keying) trans-receiver section. This unit gets data control from microcontroller 702 in the absence of grid power. The module 703 has two sections. One section is grid power detect. It will give interrupt to 702 when the grid power fails. The other section is battery charge. This section takes the grid power whenever its available and keep charging the battery 704.

The moment the grid power fails the module 703 sends the interrupt to 702. Then 702 takes subsequent action and send Data out to 701. Then 701 starts sending the signal (modulated data) over the power line (Line and Neutral) till the grid power is back.

The block 800 is an Intu-network or a LED bulb. It also has similar trans-receiver 801. This unit gets data from transponder in the absence of grid power and if the switch 806 is in closed condition. The microcontroller 802 gets the interrupt from module 803. The module 803 has two sections. The first one is grid power detect. It sends the interrupt to 802 when the grid power fails. The second section is battery charge. This section will keep the battery in charging whenever the grid power is available to 800.

When the grid power fails and if the switch 806 is closed the ASK signal reaches 800. The ASK 801 receives the data and send the demodulated data to 802. The 802 decodes the data to keep the LED light ON 805 based on the following condition LED is ON When:

1. ASK 801 receives the ASK signal and 802 decodes the data. This means that there is grid failure and switch 806 is closed
2. ASK 801 does not receive the signal and 802 does not decode the data. But at the same time 803 send grid power present signal to 802

LED is OFF when

1. ASK 801 does not receive the signal as well as 802 does not decode the data. But at the same time 803 send the interrupt that the grid power is absent. This situation is like either grid power is not available or switch 806 is open
2. The battery 804 is fully drained out and grid power is absent but the ASK 801 is receiving signal from 700

Figure 8:
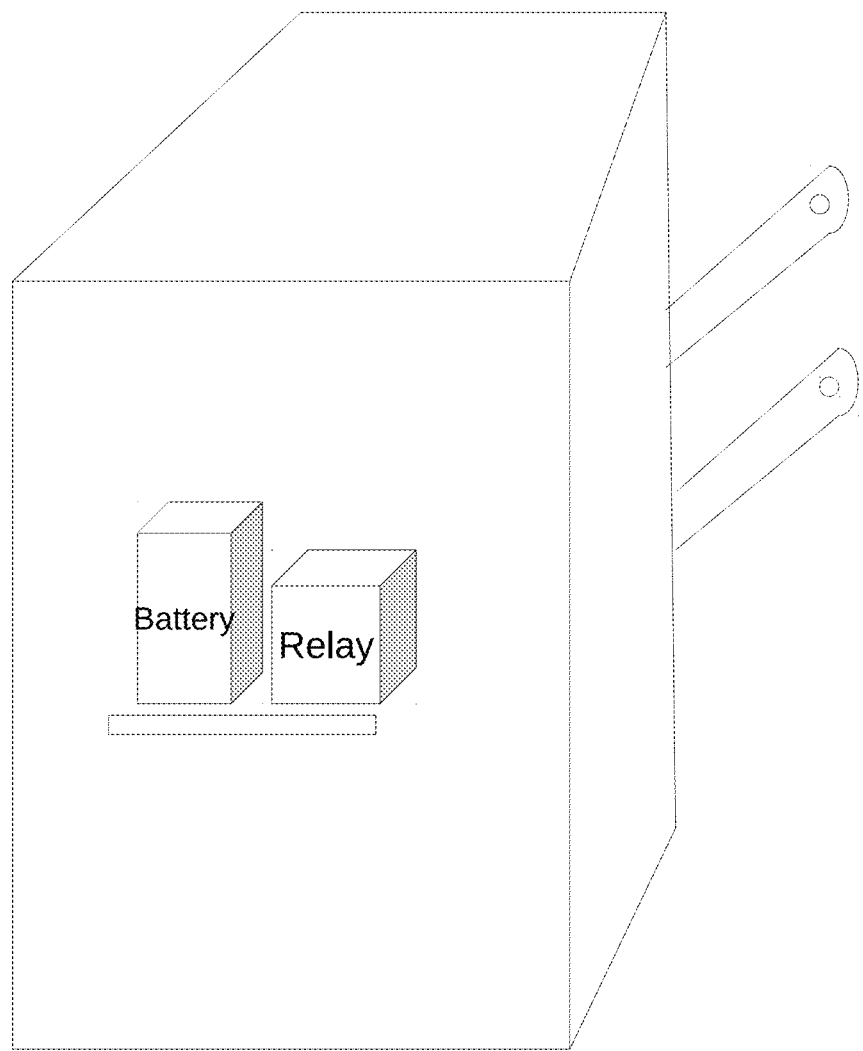
FIG. 8 depicts a diagram of a transponder, according to some embodiments.

FIG. 8 depicts a transponder circuit according to some embodiments. The transponder circuit is in an enclosure (e.g., plastic enclosure) with two leads which would be connected to line and neutral of the home mains plug. The entire transponder circuit can be accommodated in a standard cell phone wall charger form factor. FIG. 8 depicts a system which, in various embodiments, can be easily plugged into the wall socket and kept in an ON state. In various embodiments, the transponder circuit allows for flexibility as to installation location. In various embodiments, it can be installed anywhere in the home power network so that it performs its function silently. The circuit of FIG. 8 may function as a transponder unit as described herein. In various embodiments, it works in the presence and in the absence of grid power, since it has a back-up battery to transmit the signal over Line and neutral in the absence of grid power.

Figure 9:
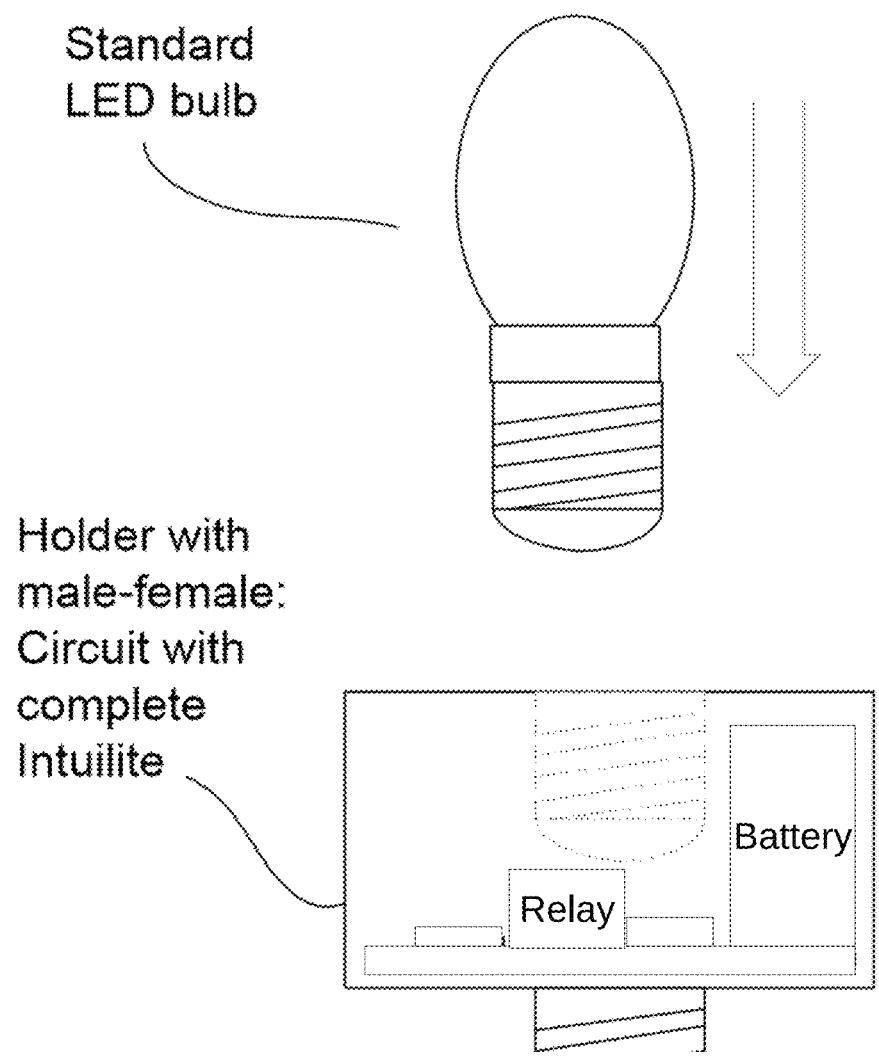
FIG. 9 depicts an exemplary device configuration, according to some embodiments.

With reference to FIG. 9, an exemplary device configuration is shown according to some embodiments. An output module, such as an LED or ordinary light, may fit into a holder which can receive the output module just as the module would otherwise be received in a conventional setting (e.g., in a light socket). The holder may then contain additional components, such as, for example, a battery, relay, circuitry, processor, transmitter, receiver, sensor, power sensor, location sensor, and/or any other components or combination of components.

INDUSTRIAL APPLICABILITY

Various embodiments may be applicable in areas which experience or are prone to power outages. Various embodiments may be applicable in emergency systems, including emergency lighting systems, public address systems, and security systems. Various embodiments may be applicable in maintaining and responding to disturbances on an electrical network, including, for example, localized power outages. Various embodiments may be applicable in terms of managing demand for power on an electrical network. Demand management may reduce the incidence of blackouts or brownouts, for example.

EMBODIMENTS

The following are embodiments, not claims:

In some embodiments, an appliance may be controlled via signals transmitted over the internet. In some embodiments, a control device may be connected to the Internet and to an electrical network. The connection to the electrical network may constitute a plug that is stuck into a wall-socket, or other means by which a typical device may harness power from the electrical network. The control device may receive signals (e.g., commands for the appliance) over the Internet. The control device may convert these signals to power-line communication signals. The control device may then transmit the power-line communication signals to the device via power-line communication.

Embodiment B

A system comprising:
an electrical network comprising one or more power lines, the one or more power lines capable of delivering electrical power to any attached devices;
a communications network;
a user device connected to the communications network;
an appliance connected to the electrical network; and
a first control device comprising:
a first transceiver connected to the communications network;
a second transceiver connected to the electrical network;
a first processor that executes instructions to:
determine a first signal received over the communications network by the first transceiver from the user device;
generate a second signal based on the first signal; and
direct the second transceiver to transmit the second signal over the electrical network to the appliance.

Embodiment B.1

The system of embodiment B in which the first signal is an internet-protocol based signal, and in which the second signal is a power line communications signal.

In various embodiments, an appliance may determine whether a switch is on or off based on whether it detects communication signals from a transponder. If the switch is on, and there is no grid power, then the appliance may activate (e.g., turn on).

Embodiment C

A system comprising:
an electrical network comprising one or more power lines, the one or more power lines capable of delivering electrical power to any attached devices and also capable of transmitting communications signals;
a first control device connected to the electrical network, the first control device comprising:
a first sensor for detecting a presence of power in the electrical network;
a first transceiver operable to transmit signals through the electrical network; and
a first processor that executes instructions to:
determine if there is electrical power in the network; and
direct, based on a determination that there is no electrical power in the network, the first transceiver to transmit a first signal through the electrical network;
a switch connected to the electrical network;
a first appliance connected to the electrical network in series with the switch and with the first control device, the appliance comprising:
a rechargeable first battery;
a second sensor operable to detect a presence of power;
a second transceiver operable to receive signals transmitted through the electrical network;
a first output module;
a second processor that executes instructions to:
determine from the second sensor whether there is power in the electrical network;
determine whether the first signal has been received by the second transceiver;
cause the output module to activate in the event that it has been determined that there is no power in the electrical network and the first signal has been received by the second transceiver; and
cause the output module to deactivate in the event that it has been determined that the first signal has not been received by the second transceiver.

Embodiment C.2

The system of embodiment C in which the second sensor is operable to detect the presence of grid power in the electrical network.

Embodiment C.3

The system of embodiment C in which the second sensor is operable to detect the presence of grid power in a local branch of the electrical network to which the first appliance is connected.

In various embodiments, an I-N appliance is in parallel with another appliance, and can still function just from the switch.

Embodiment C.1

The system of embodiment C further comprising a second appliance connected to the electrical network in series with the switch and in parallel to the first appliance, the second appliance comprising a second output module that activates only in the event that there is grid power and that the switch is in a closed position.

Embodiment C.4

The system of embodiment C in which the output module is a light-emitting diode.

Embodiment A

A system comprising:
an electrical network comprising one or more power lines, the one or more power lines capable of delivering electrical power to any attached devices and also capable of transmitting communications signals;
an appliance connected to the electrical network, the appliance comprising:
a rechargeable first battery;
a sensor for detecting a presence of power in the electrical network;
a first transceiver operable to receive first signals transmitted through the electrical network;
an output module;

a first processor that executes instructions to:
  determine a first command based on a first signal received by the first transceiver; and
  cause the output module to operate in accordance with the first command, and
a first control device connected to the electrical network, the first control device comprising:
  an input module;
  a second transceiver operable to transmit second signals through the electrical network; and
  a second processor that executes instructions to:
    determine a first user instruction received by the input module;
    determine if there is electrical power in the network; and
    direct, based on the first user instruction and based on a determination that there is no electrical power in the network, the second transceiver to transmit a third signal to the appliance via the electrical network, the third signal encoding a second command to operate the output module of the appliance in accordance with the first user instruction.

In various embodiments, a transponder can be part of an internet router.

Embodiment A.8

The system of embodiment A in which the input module is an internet router.

In various embodiments, a user instruction can come over the internet and be received at the internet router.

Embodiment A.8.1

The system of embodiment A.8 in which, in executing instructions to determine a first user instruction received by the input module, the second processor executes instructions to determine a first user instruction received over the internet at the internet router.

In various embodiments, a user device can be remote from the transponder and communicate user instructions over the internet.

Embodiment A.8.1.1

The system of embodiment A.8.1 further comprising a user device that is remote from the control device, the user device comprising a third processor that executes instructions to transmit the first user instruction to the first control device via the internet.

In various embodiments, a user device provides commands to a transponder.

Embodiment A.14

The system of embodiment A further comprising a user device, the user device comprising a third processor that executes instructions to cause the transmission of the first user instruction to the input module of the first control device.

In various embodiments, communication between the user device and the transponder can occur wirelessly.

Embodiment A.14.1

The system of embodiment A.14 in which, in executing instructions to cause the transmission of the first user instruction, the third processor executes instructions to cause the transmission of the first user instruction via one of: (a) Bluetooth; (b) Wi-Fi; and (c) cellular communication.

In various embodiments, the sensor in the appliance tells it to start listening for commands when the power is off.

Embodiment A.13

The system of embodiment A in which the first processor further executes instructions to determine whether the sensor has detected an absence of power in the electrical network, wherein, in executing instructions to determine the first command, the first processor executes instructions to determine the first command only if the sensor has detected an absence of power.

In various embodiments, control signals are transmitted via Power Line Communication.

Embodiment A.7

The system of embodiment A in which the third signal is transmitted via Power Line Communication.

In various embodiments, control signals are transmitted via amplitude shift keying modulation.

Embodiment A.5

The system of embodiment A in which the third signal encodes the second command via amplitude shift keying modulation.

In various embodiments, control signals are transmitted via frequency shift keying modulation.

Embodiment A.6

The system of embodiment A in which the third signal encodes the second command via frequency shift keying modulation.

A transponder's user interface may take various forms, in various embodiments.

Embodiment A.4

The system of embodiment A in which the input module is one of: (a) a touch screen; (b) a keypad; (c) a voice controller; (d) a dial; (e) a knob; (f) a button; and (g) a switch.

In various embodiments, a command may include a "turn on" or "turn off" command. In various embodiments, commands may provide other direction and/or intermediate direction, such as causing an LED to dim.

Embodiment A.3

The system of embodiment A in which the output module is a light-emitting diode, and in which the second command is a command to dim the light-emitting diode.

Various embodiments utilize electrical networks that are designed for power transmission. Various embodiments utilize electrical networks that are primarily designed for power transmission. However, in spite of the design and/or primary intention of the electrical network, various embodiments provide that such electrical networks may additionally be used for the communication of information, such as command signals.

Embodiment A.1

The system of embodiment A in which the electrical network transmits electrical power at 110 volts of alternating current.

Embodiment A.2

The system of embodiment A in which the output module is one of: (a) a light bulb; (b) a light-emitting diode; (c) an audio speaker; (d) a perfume diffuser; and (e) a sprinkler.

In various embodiments, a transponder may have a Wi-Fi and/or GSM module which can be used to determine its location. The module may also provide a means to control the transponder remotely, such as from an outside network, e.g., via wireless communication.

In various embodiments a transponder may communicates its location to a central device, such as to a device associated with a utility that monitors the state of an electrical network. The central device may use information obtained from the transponder, and/or from other transponders, sensors, etc., to monitor the state of the electrical network. The central device may track the date and time of grid power failures, interruptions, and/or other irregularities. A transponder can send the information to the central device that a given transponder, appliance, person, home, circuit, etc., has gotten power or gotten power back. A utility may then have the opportunity to fix problems more quickly. In various embodiments, usage of power from the grid can be reduced by telling connected appliances to temporarily go onto battery power.

In various embodiments, an appliance can be told whether to use battery power or not, based current power usage in the network. The appliance may be told by a control device. The control device may reside at a utility, for example.

Embodiment D

A system comprising:
an electrical network comprising one or more power lines, the one or more power lines capable of delivering electrical power to any attached devices;
an appliance connected to the electrical network, the appliance comprising:
a rechargeable first battery;
a first receiver operable to receive first signals;
an output module;
a first processor that executes instructions to:
determine a first command based on a first signal received by the first receiver;
cause the output module to draw power from the electrical network if the first command corresponds to a predetermined second command; and
cause the output module to draw power from the rechargeable first battery if the first command corresponds to a predetermined third command, and
a first control device connected to the electrical network, the first control device comprising:
a first transmitter operable to transmit second signals; and
a second processor that executes instructions to:
determine a level of usage of electrical power in the electrical network;
determine a fourth command that corresponds to the predetermined second command if the level of usage satisfies a first criterion, and to the predetermined third command if the level of usage satisfied a second criterion; and
direct, the first transmitter to transmit a third signal to the appliance, the third signal encoding the fourth command.

In various embodiments, a criterion for whether or not an appliance should go onto batter power could also factor in the availability of grid power, not just usage. Thus, for example, a utility may factor in both supply and demand, rather than just demand.

Embodiment D.7

The system of embodiment D in which the second processor further executes instructions to determine an availability of electrical power for the electrical network, and in which, in determining a fourth command, the second processor executes instructions to:
determine a fourth command that corresponds to the predetermined second command if the level of usage and the availability together satisfy a first criterion, and to the predetermined third command if the level of usage and the availability together satisfy a second criterion.

In various embodiments, an appliance may be instructed to start drawing upon battery power if it is determined that power usage in an electrical network is close to availability. In other words, there may be little excess power available.

Embodiment D.7.1

The system of embodiment D.7.1 in which, in determining the fourth command, the second processor executes instructions to:
determine a fourth command that corresponds to the predetermined second command if the level of usage is less than a first predetermined percentage of the availability, and to the predetermined third command if the level of usage is greater than a second predetermined percentage of the availability.

In various embodiments, an appliance may be given instructions as to whether or not to draw on battery power based on a level of usage in the local branch of the electrical network (e.g., based on usage in the neighborhood or town of the appliance.) Thus, for example power usage may be managed or optimized within small sections of an electrical grid, rather than just on the grid as a whole.

Embodiment D.5

The system of embodiment D in which, in determining a level of usage, the second processor executes instructions to determine a level of usage of electrical power in a branch of the electrical network to which the appliance is connected.

Embodiment D.6

The system of embodiment D in which the appliance further comprises:
a second transmitter; and
a location sensor,
in which the first control device further comprises a second receiver,
in which the first processor further executes instructions to:
determine a location of the appliance based on a reading from the location sensor; and
cause the second transmitter to transmit to the first control device a fourth signal encoding the location, and in which the second processor further executes instructions to determine the location of the appliance based on the reception of the fourth signal at the second receiver.

D.6.1

The system of embodiment D.6 in which, in determining a level of usage, the second processor executes instructions to:

determine a branch of the electrical network to which the appliance is connected based on the location of the appliance; and determine a level of usage of electrical power in the branch of the electrical.

Embodiment D.6.1.1

The system of embodiment D.6.1 in determining a branch of the electrical network, the second processor executes instructions to:

determine a branch of the electrical network corresponding to a particular neighbourhood.

Embodiment D.6.2

The system of embodiment D.6 in which the appliance further comprises a power sensor operable to detect power in the electrical network, and in which first processor further executes instructions to:

determine that a loss of power has occurred in the electrical network based on a reading from the power sensor; and cause the second transmitter to transmit to the first control device a fifth signal indicative of the loss of power.

In various embodiments, a control device can generate a message for someone to address an outage or address any other problem with the electrical network.

Embodiment D.6.2.1

The system of embodiment D.6.2 in which the in which the second processor further executes instructions to cause an alert to be generated based on the reception of the fifth signal at the second receiver, the alert comprising a human-readable message indicating that there has been a loss of power at the location.

In various embodiments, power outages, interruptions, or other power problems may be logged. These logs may be used to predict future power problems. E.g., conditions that historically preceded power outages may be compared to current conditions to see whether a power outage is currently likely. If a power outage or other problem is predicted, and/or predicted with some likeliness threshold, then one or more appliances may be directed to reduce their use of grid power, such as by shutting down, reducing power usage, and/or drawing power from a battery.

In various embodiments, an appliance may be told to use grid power if power usage in the grid is below a certain threshold, and to use battery power if power usage in the grid is above a certain threshold.

Embodiment D.4

The system of embodiment D in which, in determining the fourth command, the second processor executes instructions to determine a fourth command that corresponds to the predetermined second command if the level of usage is below a first predetermined threshold, and to the predetermined third command if the level of usage is above a second predetermined threshold.

Embodiment D.3

The system of embodiment D, in which the first control device further comprises a sensor operable to detect a level of usage of electrical power in the electrical network, in which, in executing instructions to determine a level of usage, the second processor executes instructions to receive an output from the sensor.

In various embodiments, signals can be received through the electrical network (e.g., via power line communication).

Embodiment D.1

The system of embodiment D in which the first receiver is operable to receive first signals transmitted through the electrical network.

Embodiment D.2

The system of embodiment D in which the first receiver is operable to receive first signals transmitted via wireless communication.

Embodiment A.9

The system of embodiment A in which the first control device further comprises a third transceiver operable to communicate via wireless signals.

Embodiment A.9.1

The system of embodiment A.9 in which the second processor further executes instructions to:

determine a second user instruction received via the third transceiver;

direct, based on the second user instruction and based on a determination that there is no electrical power in the network, the third transceiver to transmit a fourth signal to the appliance via the electrical network, the fourth signal encoding a third command to operate the output module of the appliance in accordance with the second user instruction.

Another Variation on A.9

Embodiment A.10

The system of embodiment A in which the input module comprises a third transceiver operable to communicate via wireless signals.

Embodiment A.10.1

The system of embodiment A.10 in which the second processor further executes instructions to:

determine a fourth signal received via the third transceiver; and determine a physical location of the first control device based on the fourth signal.

In various embodiments, there could be directional communication between many Intu-networks and transponders. They may share certain information such as battery status, configuration etc.

In various embodiments, communication may be from appliance to transponder. The communication may include the battery status of the appliance. If the battery us going low, the transponder may send information about the battery status and/or about the appliance to the grid (e.g., to a utility). In various embodiments, a mobile phone can get an alert that a light in a bedroom has a low battery. Thus, for example, a user may be alerted as to when one or more appliances may be in danger of losing function. In various embodiments, an appliance may include a microphone. The microphone may have emergency purposes. For example, if someone shouts for help, that information may be transmitted back to a transponder, and then sent to a smart phone (e.g., to the smart phone of another user). The smart phone may then react, such as by ringing, playing the audio picked up by the microphone, broadcasting an emergency signal, etc. In various embodiments, communication could be data, voice, and video.

In various embodiments, one device (e.g., appliance) may talk to another. For instance, a microphone in one room may communicate with a speaker in another room. This may allow a person in room of the microphone to be heard by another person in the room of the speaker. As another example, a smoke sensor can send information to another device in another room. The smoke sensor may indicate that smoke is detected or that temperature is rising. A transponder can receive the information and send it to a third party, or to another device. Communication between appliances may occur via power line communication, in some embodiments. In some embodiments, communication occurs via a transponder. In various embodiments, one device communicates with another device through a transponder.

In various embodiments, communication may occur from transponder to transponder.

Embodiment A.11

The system of embodiment A further comprising a second control device, the second control device comprising a second processor that executes instructions to:
determine an operational state of the second control device; and
direct the transmission of an indication of the operational state to the first control device.

Embodiment A.11.1

The system of embodiment A.11 in which the second control device further comprises a second battery, and in which the indication of the operational state includes an indication of a charge level of the second battery.

Embodiment A.11.2

The system of embodiment A.11 in which the indication of the operational state includes an indication of a configuration of the second control device.

In various embodiments, communication may occur from appliance to transponder.

Embodiment A.12

The system of embodiment A in which the first processor further executes instructions to:
determine an operational state of the appliance; and
direct the transmission of an indication of the operational state to the first control device.

Embodiment A.12.1

The system of embodiment A.12 in which the indication of the operational state includes an indication of a configuration of a charge level of the first battery.

The aforementioned represent some embodiments and it will be appreciated that these embodiments are not intended to be limiting, and that further embodiments are contemplated.

The invention claimed is:

1. A system comprising:
an electrical network comprising one or more power lines, the one or more power lines capable of delivering electrical power to any attached devices and also capable of transmitting communications signals;
an appliance connected to the electrical network, the appliance comprising:
a rechargeable first battery;
a sensor for detecting a presence of power in the electrical network;
a first transceiver operable to receive first signals transmitted through the electrical network;
an output module;
a first processor that executes instructions to:
determine a first command based on a first signal received by the first transceiver; and
cause the output module to operate in accordance with the first command, and
a first control device connected to the electrical network, the first control device comprising:
an input module;
a second transceiver operable to transmit second signals through the electrical network; and
a second processor that executes instructions to:
determine a first user instruction received by the input module;
determine if there is electrical power in the network; and
direct, based on the first user instruction and based on a determination that there is no electrical power in the network, the second transceiver to transmit a third signal to the appliance via the electrical network, the third signal encoding a second command to operate the output module of the appliance in accordance with the first user instruction.

2. The system of claim 1 in which the input module is an internet router.

3. The system of claim 2 in which, in executing instructions to determine a first user instruction received by the input module, the second processor executes instructions to determine a first user instruction received over the internet at the internet router.

4. The system of claim 3 further comprising a user device that is remote from the control device, the user device comprising a third processor that executes instructions to transmit the first user instruction to the first control device via the internet.

5. The system of claim 1 in which the first processor further executes instructions to determine whether the sensor has detected an absence of power in the electrical network, wherein, in executing instructions to determine the first command, the first processor executes instructions to determine the first command only if the sensor has detected an absence of power.

6. The system of claim 1 in which the third signal is transmitted via Power Line Communication.

7. The system of claim 1 in which the third signal encodes the second command via amplitude shift keying modulation.

8. The system of claim 1 in which the third signal encodes the second command via frequency shift keying modulation.

9. The system of claim 1 in which the output module is a light-emitting diode, and in which the second command is a command to dim the light-emitting diode.

10. The system of claim 1 in which the input module comprises a third transceiver operable to communicate via wireless signals.

11. The system of claim 1 further comprising a second control device, the second control device comprising a second processor that executes instructions to:
   determine an operational state of the second control device; and
   direct the transmission of an indication of the operational state to the first control device.

12. The system of claim 11 in which the second control device further comprises a second battery, and in which the indication of the operational state includes an indication of a charge level of the second battery.

13. The system of claim 11 in which the indication of the operational state includes an indication of a configuration of the second control device.

14. The system of claim 1 in which the first processor further executes instructions to:
   determine an operational state of the appliance; and
   direct the transmission of an indication of the operational state to the first control device.

15. A system comprising:
   an electrical network comprising one or more power lines, the one or more power lines capable of delivering electrical power to any attached devices and also capable of transmitting communications signals;
   a first control device connected to the electrical network, the first control device comprising:
      a first sensor for detecting a presence of power in the electrical network;
      a first transceiver operable to transmit signals through the electrical network; and
      a first processor that executes instructions to:
         determine if there is electrical power in the network; and
         direct, based on a determination that there is no electrical power in the network, the first transceiver to transmit a first signal through the electrical network,
   a switch connected to the electrical network;
   a first appliance connected to the electrical network in series with the switch and with the first control device, the appliance comprising:
      a rechargeable first battery;
      a second sensor operable to detect a presence of power;
      a second transceiver operable to receive signals transmitted through the electrical network;
      a first output module;
      a second processor that executes instructions to:
         determine from the second sensor whether there is power in the electrical network;
         determine whether the first signal has been received by the second transceiver;
         cause the output module to activate in the event that it has been determined that there is no power in the electrical network and the first signal has been received by the second transceiver; and
         cause the output module to deactivate in the event that it has been determined that the first signal has not been received by the second transceiver.

16. The system of claim 15 in which the second sensor is operable to detect the presence of grid power in the electrical network.

17. The system of claim 15 in which the second sensor is operable to detect the presence of grid power in a local branch of the electrical network to which the first appliance is connected.

18. The system of claim 15 further comprising a second appliance connected to the electrical network in series with the switch and in parallel to the first appliance, the second appliance comprising a second output module that activates only in the event that there is grid power and that the switch is in a closed position.

* * * * *